US009873529B2

(12) United States Patent
Reed (10) Patent No.: US 9,873,529 B2
(45) Date of Patent: Jan. 23, 2018

(54) SPACE OBJECT CAPTURE (71) Applicant: AIRBUS DEFENCE AND SPACE LIMITED, Stevenage (GB)

(72) Inventor: Jaime Reed, Stevenage (GB)

(73) Assignee: AIRBUS DEFENCE AND SPACE LIMITED, Stevenage, Hertfordshire (GB)

( * ) Notice: Subject to any disclaimer, the term of this patent is extended or adjusted under 35 U.S.C. 154(b) by 214 days.

(21) Appl. No.: 14/405,714

(22) PCT Filed: Jun. 5, 2013

(86) PCT No.: PCT/EP2013/061622
§ 371 (c)(1),
(2) Date: Dec. 4, 2014

(87) PCT Pub. No.: WO2013/182616
PCT Pub. Date: Dec. 12, 2013

(65) Prior Publication Data
US 2015/0151856 A1 Jun. 4, 2015

(30) Foreign Application Priority Data
Jun. 7, 2012 (EP) .................................... 12275089

(51) Int. Cl.
*B64G 1/10* (2006.01)
*B64G 1/64* (2006.01)
*B64G 1/24* (2006.01)

(52) U.S. Cl.
CPC ............. *B64G 1/64* (2013.01); *B64G 1/1078* (2013.01); *B64G 1/242* (2013.01); *B64G 1/646* (2013.01); *B64G 1/648* (2013.01)

(58) Field of Classification Search
CPC ........ B64G 1/1078; B64G 1/646; B64G 1/64; B64G 1/242; B64G 1/648; B64G 1/222; B64F 1/12; B64F 1/125; B64F 1/16
See application file for complete search history.

(56) References Cited

U.S. PATENT DOCUMENTS 2,343,350 A * 3/1944 Warren ..................... B64F 1/12
52/156
3,333,540 A * 8/1967 Clark ...................... F42B 12/68
102/400
(Continued)

FOREIGN PATENT DOCUMENTS

FR   EP 0611693 A1 *  8/1994  ............. B64F 1/125
FR      2933954 A1 *  1/2010  ............. B64F 1/125
(Continued)

OTHER PUBLICATIONS

Thiel et al, "The Rosetta Lander Anchoring System".*
(Continued)

*Primary Examiner* — Assres H Woldemaryam
(74) *Attorney, Agent, or Firm* — Buchanan Ingersoll & Rooney PC (57) ABSTRACT

There is provided an apparatus for capturing a space object, the apparatus comprising a harpoon element for penetrating the object, the harpoon element being configured to form part of a harpoon for launching towards the object; and penetration control means for controlling the penetration of the harpoon element into the object. The penetration control means can comprise a compressible component, forming part of the harpoon, for absorbing some of the kinetic energy of the harpoon. Alternatively or additionally, it may comprise means for varying the launch speed of the harpoon.

14 Claims, 4 Drawing Sheets

(56) References Cited

U.S. PATENT DOCUMENTS

| | | | | |
|---|---|---|---|---|
| 4,750,692 | A * | 6/1988 | Howard | B64G 1/648 |
| | | | | 102/504 |
| 5,080,304 | A * | 1/1992 | Stump | B64F 1/16 |
| | | | | 244/100 R |
| 5,141,520 | A * | 8/1992 | Goble | A61B 17/0401 |
| | | | | 606/104 |
| 6,176,519 | B1 * | 1/2001 | Limingoja | B60D 1/54 |
| | | | | 180/287 |
| 7,207,525 | B2 * | 4/2007 | Bischof | B25J 15/10 |
| | | | | 244/158.2 |
| 7,275,889 | B1 * | 10/2007 | McGill | E01F 13/12 |
| | | | | 404/6 |
| 7,926,408 | B1 * | 4/2011 | Kley | F41A 33/02 |
| | | | | 124/73 |
| 8,240,613 | B2 * | 8/2012 | Ritter | B64G 1/646 |
| | | | | 24/595.1 |
| 2003/0192995 | A1 * | 10/2003 | Tchoryk | B64G 1/646 |
| | | | | 244/172.4 |
| 2007/0210212 | A1 * | 9/2007 | Tchoryk | B64G 1/646 |
| | | | | 244/172.4 |
| 2010/0154766 | A1 * | 6/2010 | Skilling | F41A 1/06 |
| | | | | 124/71 |
| 2011/0056471 | A1 * | 3/2011 | Kilvert | F41B 11/00 |
| | | | | 124/57 |
| 2011/0121139 | A1 | 5/2011 | Poulos | |
| 2012/0112003 | A1 * | 5/2012 | Affre De Saint Rome | F16B 21/16 |
| | | | | 244/115 |

FOREIGN PATENT DOCUMENTS

| | | | | |
|---|---|---|---|---|
| NL | WO 9013480 A1 * | 11/1990 | | B64F 1/125 |
| WO | WO 2010/112716 A1 | 10/2010 | | |

OTHER PUBLICATIONS

Mazanek et al. "Asteroid Retrieval Mission Concept—Trailblazing Our Future in Space and Helping to Protect Us from Earth Impactors", 2013.*
Tiel et al. "The Rosetta Lander anchoring system Prior art date", SOA/NASA09/2003.*
Biele, "From the Rosetta Lander Philae to an Asteroid Hopper: Lander Concepts for Small Bodies Missions", 2006.*
Fujii et al. "Experimental Study on Penetration Performance for Sampling of Asteroid Mission", 2011.*
International Search Report (PCT/ISA/210) mailed on Sep. 23, 2013, by the European Patent Office as the International Searching Authority for International Application No. PCT/EP2013/061622.
Written Opinion (PCT/ISA/237) mailed on Sep. 23, 2013, by the European Patent Office as the International Searching Authority for International Application No. PCT/EP2013/061622.
European Search Report for EP 12275089.6 dated Jan. 7, 2013.
Examination Report for EP 12275089.6 dated Sep. 18, 2013.
N. Kömle et al., "Using the anchoring device of a comet lander to determine surface mechanical properties", Planetary and Space Science, Dec. 1997, pp. 1515-1538, vol. 45, No. 12.

* cited by examiner

SPACE OBJECT CAPTURE

FIELD OF THE INVENTION

The invention relates to the capture of an object in space. More particularly, but not exclusively, it relates to the capture of objects such as space debris.

BACKGROUND OF THE INVENTION

There is considerable concern about the amount of artificial space debris in orbit around the Earth. Even very small debris objects can cause significant damage to other objects in space as relative velocities in orbit can reach many kilometers per second. Some of the space debris orbiting the Earth includes large objects, ranging from inactive satellites to expended rocket booster stages. The debris objects, such as those mentioned, can cause serious damage to a spacecraft on collision and be a plentiful source of further smaller debris fragments in the event of a collision with a space vehicle or other debris objects. The amount of space debris already in orbit is thought to pose a threat to the continued use of certain orbital bands.

It is desirable to find a suitable method of neutralising the problems which debris objects present. It has been suggested that disused low Earth orbit (LEO) satellites could be deorbited and allowed to burn-up in the Earth's atmosphere, and that disused geosynchronous orbit (GEO) satellites, occupying valuable orbital slots, could be moved into graveyard orbits either side of the GEO band.

The idea of using a space vehicle to capture a debris object, in order to then deorbit it, has been suggested. However, performing this task safely, efficiently and reliably is made difficult by the nature of the debris. The objects in question vary greatly in size, shape and construction and they may also spin at different angular velocities. Moreover, there are debris objects about which little may be known concerning their internal structure. Debris objects may contain internal components which one would not wish to damage, for example a fuel tank or a nuclear reactor.

The invention was made in this context.

SUMMARY OF THE INVENTION

According to the invention, there is provided an apparatus for capturing a space object, the apparatus comprising a harpoon element for penetrating the space object, the harpoon element being configured to form part of a harpoon for launching towards the object; and penetration control means for controlling the penetration of the harpoon element into the object.

The penetration control means may comprise retardation means forming part of the harpoon for absorbing some of the kinetic energy of the harpoon on impact with the space object. Alternatively or additionally, it may comprise means for varying the launch speed of the harpoon. By being able to control the penetration of the harpoon element into an object, the capture process can be tailored for the specific object to be captured. The invention allows both small and large debris objects to be captured. Moreover, the invention allows different objects having walls of different thickness and being constructed of different materials to be captured.

If the penetration control means comprise retardation means, the retardation means may be coupled to the harpoon element and may comprise a compressible component arranged to compress on impact between the retardation means and the space object to control the extent of penetration of the harpoon element into the object. The compressible component absorbs some of the kinetic energy of the harpoon when it compresses. The compressible component of the retardation means may comprise a crushable element arranged to deform on impact with the space object to control the extent of penetration.

The harpoon may comprise a first section, providing the harpoon element, and a second section coaxially joined with the first section, the first section and the second section each having an outer surface extending in a longitudinal direction of the harpoon, and the second section having a larger cross-sectional area than the first section to provide an end surface around the base of the first section, wherein the retardation means extends at least partially around at least a portion of the outer surface of the first section and the end surface of the second section is arranged to abut the retardation means, at least on impact, and provide a back stop surface for the retardation means for the retardation means to be compressed against.

The retardation means may comprise a front plate, a back plate and said compressible component between the front plate and the back plate, and the front plate, the back plate and the compressible component may each have a hole arranged to receive the first section. The retardation means may be located such that the back plate is in contact with at least a portion of the end surface of the second section.

The compressible component may comprise a columnar honeycomb structure orientated such that its column axes are substantially parallel to the longitudinal axis of the first and the second section. The compressible component may alternatively comprise foam, a viscous damper or an eddy current damper.

The apparatus may further comprise a launch arrangement for the harpoon, and the penetration control means may comprise means, in the launch arrangement, for varying the launch velocity of the harpoon. The launch arrangement may comprise an expansion cylinder, a gas flow arrangement and a compressed gas supply for launching the harpoon and the means for varying the launch speed may comprise a controller for varying the pressure of the gas in the expansion chamber to thereby vary the launch velocity of the harpoon and control the depth of penetration of the harpoon element into the object. Consequently, the firing velocity can be changed in flight by changing the charge pressure.

The launch arrangement may be configured to launch a plurality of harpoons and may comprise an expansion chamber for each of the plurality of harpoons. The controller may be configured to control the flow of gas to each expansion chamber to simultaneously or individually launch the plurality of harpoons.

The or each harpoon may comprise a barb arrangement coupled to the harpoon element for preventing the harpoon element from being removed from the harpooned object. The harpoon element may have a substantially elongated shape and the barb arrangement may comprise at least one barb hinged to the harpoon element, the at least one barb being configured to be arranged at an acute angle to a longitudinal axis of the elongate harpoon element when deployed.

The or each harpoon may further comprise a deorbiter for deorbiting a captured space object, the deorbiter comprising a rocket, a thruster or a sail. Alternatively or additionally, the harpoon may be tethered to the spacecraft and the spacecraft may comprise a propulsion arrangement for deorbiting a captured object.

According to the invention, there may also be provided a system comprising the apparatus. The system may comprise a spacecraft and one or more harpoons. The means for controlling the penetration of the harpoon element into the object may comprise one or both out of the described means for controlling the launch speed of the one or more harpoons and the described retardation means. The spacecraft may comprise a launch arrangement comprising said means for controlling the launch speed and the, or each, of the one or more harpoons may comprise retardation means for absorbing some of the kinetic energy of the harpoon on impact with a space object. If the system comprises a plurality of harpoons, the harpoons may be provided with retardation means with different characteristics such that a suitable harpoon can be selected for each target object in dependence on the type of retardation means of that harpoon.

According to the invention, there is further provided a space vehicle comprising a launch arrangement for launching one or more harpoons for firing at and capturing one or more space objects, the launch arrangement comprising means for controlling the penetration of the one or more harpoons into the space objects.

According to the invention, there is also provided a method of capturing an object in space using a system comprising a spacecraft and at least one harpoon for launching towards the object, the or each harpoon of the at least one harpoon comprising a harpoon element for penetrating the object and the system further comprising means for controlling the penetration of the harpoon element into the object, the method comprising: characterising an object to be captured; selecting at least one parameter for controlling the depth of penetration of the harpoon element into the object, wherein selecting at least one parameter comprising selecting at least one out of a parameter corresponding to a launch velocity and, if the at least one harpoon comprises a plurality of harpoons, a characteristic associated with one or more harpoons out of the plurality of different harpoons; and providing instructions to the spacecraft for launching the harpoon, wherein said instructions include said at least one parameter.

The spacecraft may comprise a launch arrangement comprising a compressed gas supply and a respective launching mechanism for the or each of the at least one harpoon for launching said at least one harpoon using gas from said compressed gas supply and the method may further comprise controlling the pressure of the gas provided to the or each launching mechanism to launch the one or more harpoons at the selected velocity. Selecting at least one parameter corresponding to a launch velocity may comprise selecting the launch velocity or selecting a pressure and/or volume of gas for realising a desired launch velocity.

The at least one harpoon may comprises a plurality of harpoons, each harpoon comprising a harpoon element for penetrating the object and retardation means comprising a compressible component arranged to compress on impact with the space object to control the extent of penetration of the harpoon element into the object and selecting at least one parameter may comprise selecting at least one out of a characteristic of the respective retardation means of a harpoon or a length of the harpoon element.

BRIEF DESCRIPTION OF THE DRAWINGS

Embodiments of the present invention will now be described, by way of example, with reference to the accompanying drawings, in which.

DETAILED DESCRIPTION

Figure 1:
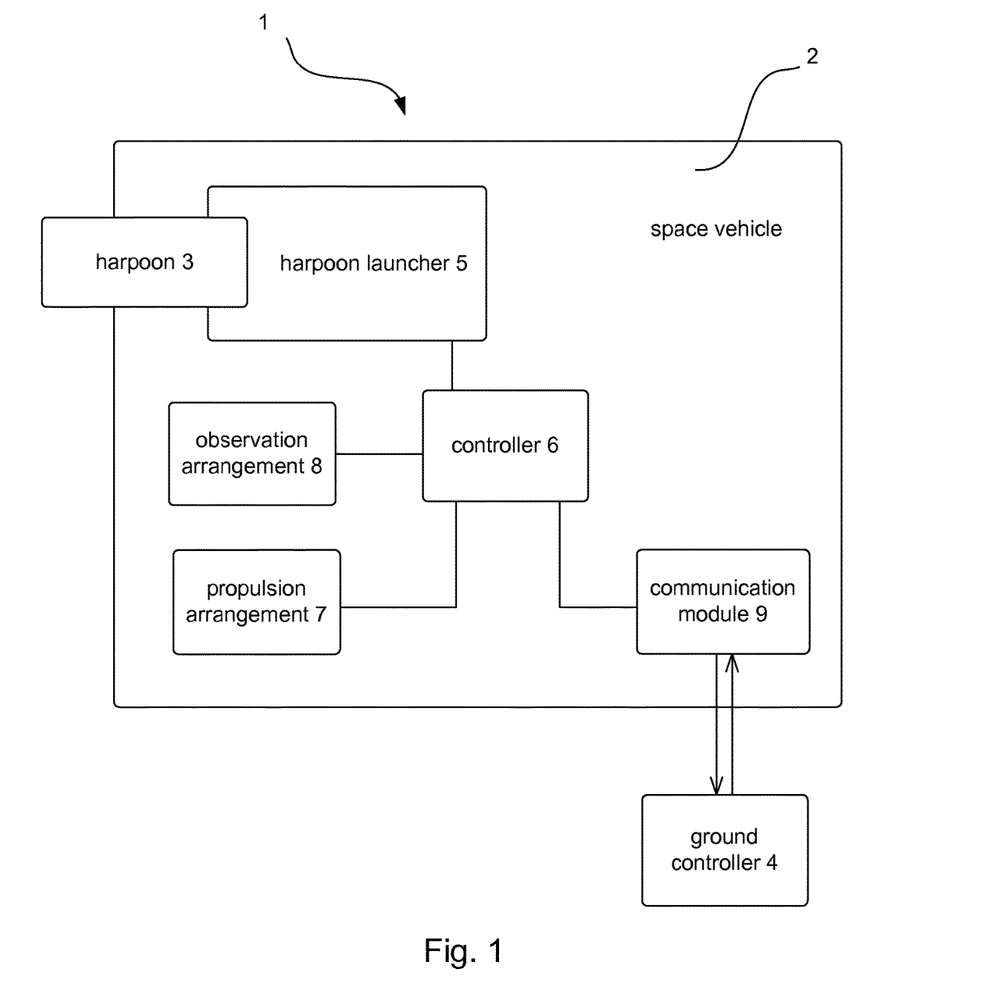
FIG. 1 is a schematic diagram showing the components of a system for capturing objects in space.

With reference to FIG. 1, a system 1 for capturing objects in space is shown comprising a space vehicle 2, a harpoon 3 and a ground controller 4. The space vehicle comprises a harpoon launcher 5, a controller 6, a propulsion arrangement 7, an observation arrangement 8 and a communication module 9. The space vehicle may, for example, be in geocentric orbit. It may, for instance, be in a low Earth orbit (LEO) or a geosynchronous orbit (GEO).

The harpoon 3 can be fired at, and capture, space debris and once the harpoon has engaged with the space debris the system 1 can be used to deorbit the space debris. The harpoon launcher 5 is used to launch the harpoon towards the space debris. The system allows the distance to which the harpoon travels into the object to be controlled as will be described in more detail below. The harpoon and the harpoon launcher will be described in more detail with reference to FIGS. 2, 3 and 4 below.

The propulsion arrangement 7 is capable of propelling the space vehicle 2 and may for example comprise a system of rocket thrusters capable of controlling parameters of the orbit of the space vehicle as well as the orientation of the space vehicle. The propulsion arrangement may, for example, be used to control the rendezvous of the space vehicle with objects in space. Furthermore, the propulsion arrangement may be used to orientate the space vehicle in order to aim the harpoon 3 at an object to be captured. Additionally, if appropriate, it may also be used to deorbit the harpooned object, as will be described in more detail below The observation arrangement 8 may comprise one or more instruments capable of determining information about objects in space. For example, the observation arrangement 8 may comprise optical sensors for observing visual characteristics of objects in space. For instance, the observation arrangement may comprise a stereoscopic camera for determining the range of an observed object and of generating three-dimensional imagery of the object. Furthermore, the observation arrangement may, for example, comprise a radar system for detecting reflected radiation from the object to be captured to allow the characteristics of the object to be examined. For instance, the radar system may be capable of determining the bearing, range, relative movement, and size of objects in space. Furthermore, the radar system may be capable of determining aspects of the structure of an object and, if an object is rotating, its axis and rate of rotation. In this way the observation arrangement may provide information about objects in space which would be of use in the capture of those objects. For example, the observation arrangement may determine information about an object from which a suitable area of the object can be selected for harpooning, or it may determine information about an object to facilitate the rendezvous of the space vehicle 2 with the object. The observation arrangement 8 may also be used to determine information for identifying target objects. For example, data obtained by the observation arrangement or data derived from data obtained by the observation arrangement may be compared to data stored in a database of space debris objects. The database may store information, such as orbital information, mass properties and geometric properties, of a number of objects and the data obtained using the observation arrangement can be used to verify that an encountered object is a target object by verifying that the encountered object has the characteristics indicated by the information for the target object stored in the database.

The ground controller 4 is used for controlling the space vehicle 2 from the ground and can transmit signals comprising instructions to the communication module 9 of the space vehicle and receive signals from the communication module of the space vehicle. The ground controller 4 may comprise equipment located in one or more ground stations. The ground controller 4 may include one or more antennas and signal processing equipment for receiving downlink signals from the communication module 9 and for transmitting uplink signals to the communication module. The ground controller may also include one or more general purpose computers or dedicated data processing devices for carrying out data analysis and a memory for storing information required for the capture of a space object. For example, an operator on ground would be able to monitor the performance of the space vehicle, analyse information gathered by the space vehicle and control aspects of the operation of the space vehicle using the ground controller 4. Moreover, the communication module 9 may comprise one or more antennas and signal processing equipment configured to receive and amplify uplink radio signals from the ground controller 4 as well as transmitting downlink radio signals to the ground controller. For example, the communication module 9 may receive signals from the ground controller 4 comprising instructions for the space vehicle controller 6 to carry out, and it may transmit information from the systems on board the space vehicle, including observation information from the observation arrangement 8, back to the ground controller 4.

The space vehicle controller 6 interfaces with and controls the systems of the space vehicle 2, including the harpoon launcher 5, propulsion arrangement 7, observation arrangement 8, and communication module 9. For example, the controller 6 may comprise one or more processors or a central processing unit (CPU). Furthermore, as well as carrying out instructions received from the ground controller 4, via the communication module 9, the controller may perform a number of tasks automatically.

By imparting an impulse on a space debris object in orbit, the properties of the orbit of the object can be altered, or the object can be brought out of orbit. For instance, if, over time, a force is applied to an object in LEO in the opposite direction to that of the movement of the object, then the orbital radius of the object will decrease. Furthermore, this process can be continued until the object is deorbited by its entering the atmosphere of the Earth. If the harpoon 3 is tethered to the space vehicle 2, the propulsion arrangement 7 may be used to affect an impulse on an object after it has been harpooned in order to change the trajectory of the object. As mentioned above, this may be done to alter an object's orbit or to deorbit an object. Furthermore, if the harpoon 3 is tethered to the space vehicle 2, the propulsion arrangement 7 may be used to control the attitude of the space vehicle together with the harpooned object. The propulsion arrangement could be used to stabilise the movement, and control the orientation, of the composite system including the harpooned object, the tether and the space vehicle. Alternatively, the harpoon 3 may not be tethered to the space vehicle 3 and may instead comprise a means for independently affecting an impulse on a harpooned object in order to alter its orbit or deorbit it, as will be described in more detail with reference to FIG. 4.

Figure 2:
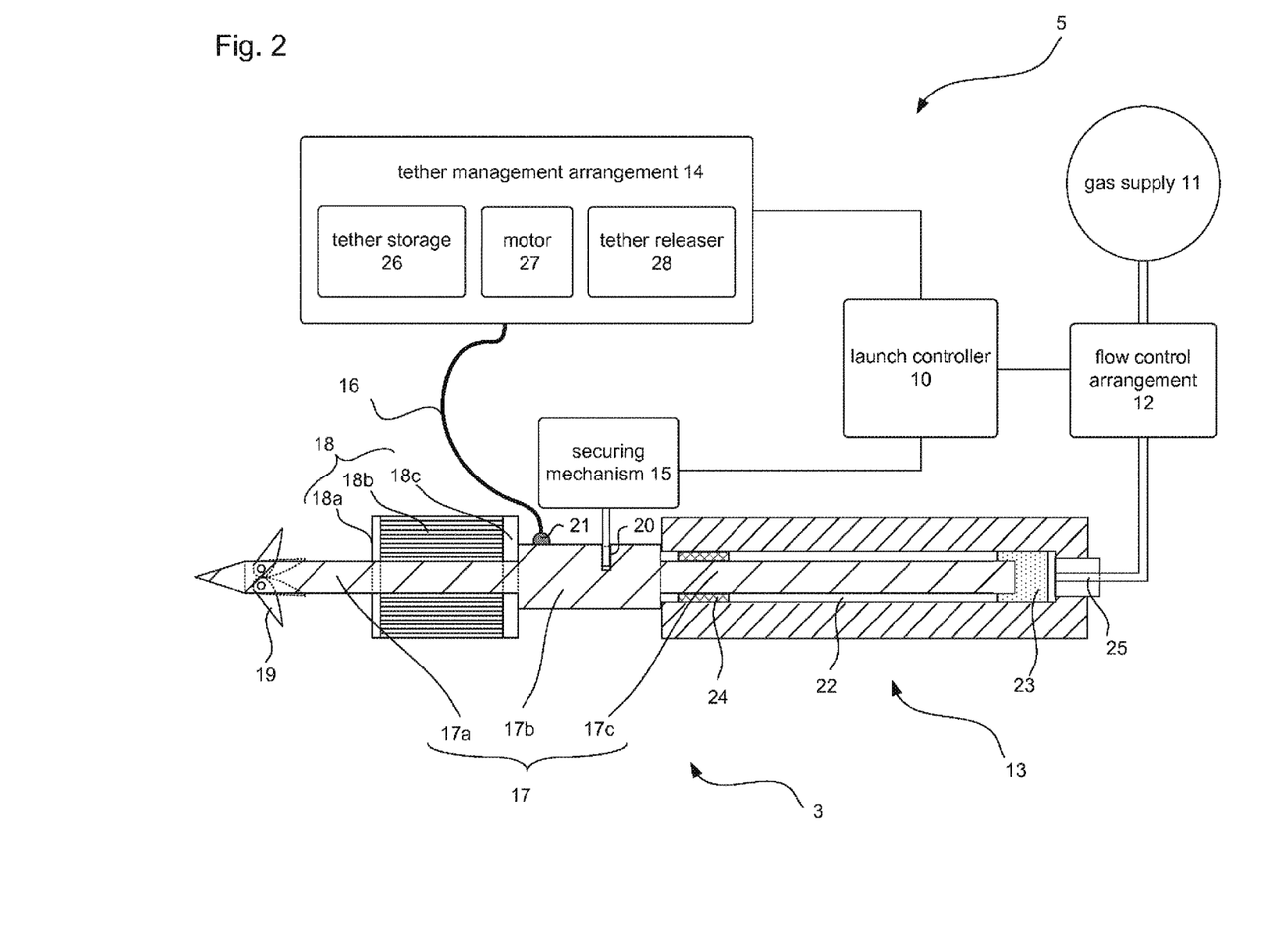
FIG. 2 is a schematic diagram showing the components of a harpoon launcher and a harpoon loaded therein.

With reference to FIG. 2, the components of the harpoon launcher 5 and the harpoon 3 are shown in more detail. The harpoon launcher 5 comprises a launch controller 10, a gas supply 11, a flow control arrangement 12, a launching mechanism 13, a tether management arrangement 14 and a securing mechanism 15 for securing the harpoon to the launcher.

The harpoon 3 is shown loaded into the launching mechanism 13 of the harpoon launcher 5 prior to being launched, and is connected to the tether management arrangement 14 of the harpoon launcher via a tether 16.

The harpoon 3 comprises a main body 17, a retardation component 18 for controlling the penetration of the harpoon into the target, barbs 19 for securing the harpoon to the target object once the harpoon has penetrated the object, a securing element 20 for cooperating with the securing mechanism 15 of the launcher and an attachment element 21 for attaching the harpoon to the tether 16.

The gas supply 11 provides a supply of pressurised gas to the flow control arrangement 12. For example, the gas supply 11 may be a pressure vessel containing pressurised nitrogen gas or other suitable pressurised gas. It may be connected to the flow control arrangement 12 via piping, through which the gas can pass from the pressure vessel to the flow control arrangement.

The flow control arrangement 12 is controlled by the launch controller 10 to allow an amount of gas, from the gas supply 11, to pass to the launching mechanism 13 so that, through the mechanics of the launching mechanism 13, the gas will cause the harpoon 3 to be launched from the harpoon launcher 5 as will be described in more detail below. The flow control arrangement 12 is further controlled by the launch controller 10 to vary and control the pressure and/or volume of gas it allows to pass to the launching mechanism 13. Through the mechanics of the launching mechanism 13, the force with which a harpoon 3 is launched, and therefore the speed of a launched harpoon, is dependent on the pressure and/or volume of the gas which is passed to the launching mechanism 13 by the flow control arrangement 12. The flow control arrangement 12 may, for example, comprise a system of gas piping, solenoid valves and one or more electronic pressure sensors.

The launching mechanism 13 may comprise a launch barrel 22, a piston bush 23, an alignment bush 24 and a gas port 25 as shown in FIG. 2. The launch barrel 22 may be a cylindrical space formed from any suitable material. For example, the launch barrel 22 may be the interior of a hollow metal cylinder. The gas port 25 is at a first end of the launch barrel. The gas port 25 receives the gas provided by the flow control arrangement 12 and provides a passage for the gas to pass into the first end of the launch barrel 22 while otherwise sealing the first end of the launch barrel. The launch barrel 22 provides an expansion chamber for pressurised gas for pushing the harpoon 3 out of the launch barrel.

The alignment bush 24 is a tubular bush which is fixed coaxially inside the launch barrel 22 towards a second end of the launch barrel 22 and which fits the internal diameter of the launch barrel. The piston bush 23 is a tubular bush wherein, however, a first end of the cylindrical hole of the bush is closed. The piston bush sits coaxially inside the launch barrel, between the alignment bush 24 and the gas port 25, with its closed end facing the gas port 25. The open end receives the back end of the harpoon. The piston bush is free to move up and down within the launch barrel and seals against the walls of the launch barrel. As will be described in more detail below, in some embodiments, the launching mechanism may not include a piston bush and the pressure of the gas, as it expands, may push directly on the rear end of the harpoon. The operation of the launching mechanism 13 will be described in more detail below.

The launch controller 10 interfaces with and controls the flow control arrangement 12, the securing mechanism 15 and the tether management arrangement 14. Moreover, the launch controller 10 controls the speed at which a harpoon 3 is launched from the harpoon launcher by controlling the flow control arrangement 12 to deliver an appropriate pressure and/or volume of gas from the gas supply 11 to the launching mechanism 13. The launch controller 10 may, for example, comprise one or more processors or a central processing unit (CPU). The launch controller may further interface with the controller 6 of the space vehicle described with respect to FIG. 1. The central controller 6 of the space vehicle may provide the launch controller 10 with instructions for the operation of the harpoon launcher 5, which the launch controller would carry out. Furthermore, as well as carrying out instructions received from the central controller 6, the launch controller 10 may perform a number of tasks automatically.

The main body of the harpoon 17 comprises three cylindrical sections joined coaxially in the following order: a forward section 17a, a middle section 17b and an aft section 17c. The forward section is located at a first end of the main body of the harpoon corresponding to the end of the harpoon which will penetrate objects at which it is launched. The forward section is tapered to a point for perforating the surface of the target object. The middle section 17b of the harpoon is greater in diameter than the forward section 17a. It may also be greater in diameter than the aft section 17c. The middle section 17b extends in a longitudinal direction from the forward section and since it is greater in diameter than the forward section, it provides an end surface, around the base of the first section, transverse to the direction in which the middle section and front section extends. The front section and the middle section may have an outer surface parallel to the longitudinal axis of the main body and the end surface of middle section is transverse to the outer surface. The end surface provides a back-stop surface for the retardation component 18 as will be described in more detail below. The main body 17 of the harpoon may, for example, be made out of stainless steel or tungsten.

The aft section 17c of the harpoon is fitted within the launch barrel 22, before launch, such that it passes through, and is free to move within, the alignment bush 24 and such that the second end of the main body, corresponding to the rear end, sits within the open end of the piston bush 23. In this way, the alignment bush 24 and the piston bush 23 together maintain the coaxial alignment of the aft section 17c of the space harpoon with the launch barrel prior to the launch of the space harpoon.

The retardation component 18 comprises a front plate 18a, an absorber component 18b, and a back plate 18c. As shown in FIG. 2, the absorber component, front plate and back plate may be cylinders of similar diameter connected coaxially to form the retardation component, with the absorber component 18b sitting between the front plate 18a and the back plate 18c. Through each of the absorber component, front plate and back plate is a coaxial hole, within which the forward section 17a of the harpoon lies such that the back plate 18b is in contact with the end surface of the middle section 17c of the harpoon. It will be appreciated that the end surface does not have to be exactly transverse to the outer surface. The end surface may include at least a portion which is substantially transverse to the longitudinal direction of the main body of the harpoon to provide the back stop for the retardation component.

The frontal area of the harpoon is the area of the harpoon seen when the first end of the harpoon is viewed from a position forward of the first end of the harpoon along the cylindrical axis of the main body of the harpoon. The frontal area of the harpoon would therefore comprise the front plate 18a of the retardation component, as well as the forward section 17a of the harpoon main body. In the harpoon shown in FIG. 2, as an example, the cylindrical retardation component 18 is shorter in length than the forward section 17a. However, in different embodiments, the length of the retardation component could be such that it protrudes beyond the front of the forward section of the harpoon. As a specific example, the harpoon may have a length of 300 mm whereas the retardation component may only have a length of approximately 70 mm. The diameter of the cylindrical retardation component may be 40 mm. The overall weight of the harpoon may be just 200 g.

The absorber component provides a compressible component and would typically comprise material which, if compressed at approximately the level of force with which the harpoon might be expected to impact an object at which it is launched, would fail structurally, or deform, in a progressive manner. For instance, the absorber component may comprise a crushable structure such as an aluminium columnar honeycomb structure, orientated such that its column axes are parallel to the cylindrical axis of the absorber component, corresponding to the axis of the main body of the harpoon. As an alternative, the absorber component could comprise a lightweight columnar honeycomb structure made from a different metal. The absorber component 17b may further be configured such that it will fail structurally or deform in compression before the surface of a certain target object would fail structurally or deform under similar loading.

It will be appreciated that although the sections of the main body of the harpoon have been described as cylindrical, they could have any suitable shape. The retardation component 18 can be coupled to the main body of the harpoon, and therefore the end penetrating the space object, in any suitable way. As indicated above, the retardation component can extend around an outer surface of the main body. Moreover, the main body may have a section with a larger cross-section than the section of the harpoon which will penetrate a space object to provide a surface which the retardation component abuts, at least during impact, and against which the retardation component can be compressed. However, a back plate of the retardation component may alternatively be fixed to the main body in an alternative manner for the absorber component to be compressed against the back plate. It will also be appreciated that although the retardation component has been described to comprise a cylindrical front plate, absorber component and back plate, the retardation component can take on any suitable form. For example, the front plate, absorber component and back plate do not need to be cylindrical, or the retardation component does not need to include each of a front plate, absorber component or back plate.

The absorber component has been described above to be made from aluminium, as a specific example, but a different grade of metal could of course be used. Moreover as an alternative, the retardation component may comprise an absorber component comprising foam or a damping mechanism, for instance a viscous damper, such as a gas damper, or an eddy current damper. In this case, the damping mechanism would be configured to damp the compression of the retardation component when a compressive force is applied to the retardation component in a direction approximately parallel to the cylindrical axis of the forward section.

The barbs 19 comprise two barbs pivotally attached to opposite sides of the forward section, in front of the retardation component, such that the barbs are free to pivot between, in a first position, being predominantly flush with the cylindrical sides of the forward section and pointing aft, towards the second end of the harpoon main body, and, in a second position, pointing aft at an acute angle to the sides of the forward section. The barbs may for example be made out of stainless steel or titanium. The barbs may also be spring loaded with an extension spring or a torsion spring (not shown) which will restrain the barbs during transit by acting to hold them in their pivotal first position. Alternatively, it is conceived that, during transit, the barbs may be secured in their first position by a plastic band (not shown) fitting around the barbs and the circumference of the forward section 17a at the barbs. In the event of the harpoon impaling an object at which it is launched, this plastic band would be dislodged aft along the forward section, therefore freeing the barbs to pivot. Moreover, for the same purpose, a band similar to that described may be used in conjunction with spring loading of the barbs.

The securing element 20 of the harpoon cooperates with the securing mechanism 15 of the harpoon launcher to secure the harpoon in the launcher. The securing mechanism 15 may comprise a pin puller and a protruding pin. The securing element may comprise a hole in the middle section 17b of the harpoon into which the un-retracted pin of a pin puller of the securing mechanism 15 can locate when the harpoon is loaded into the launch barrel. The pin puller may be configured to retract the pin from the corresponding hole in the main body of the harpoon on instruction from the launch controller 10. In this way, the pin of the pin puller will secure the harpoon within the launch barrel 22 prior to the harpoon being launched. The securing mechanism and securing element are further configured such that if the pin puller retracts its pin, the pin will be disengaged from the hole, therefore freeing the harpoon to move out of the launch barrel. The pin puller may, for example, be a solenoid operated pin puller or a pin puller which operates by means of a shape memory material actuator. The securing mechanism and element are not limited to being a pin puller, a pin and a corresponding hole in the main body of the harpoon. Other types of securing element and/or securing mechanism may be used to secure to the harpoon prior to it being launched. For example, the securing element may be a piece of ferrous metal connected to the harpoon, and the securing mechanism may be an electromagnet capable of strongly attracting the ferrous metal of the securing element when switched on.

A first end of the tether 16 may be attached to the attachment element 21 of the harpoon and a second end of the tether may be attached to the tether management arrangement 14. The tether for attaching the harpoon 3 to the tether management arrangement 14 may, for example, comprise a cable formed of synthetic fibres of ultra-high-molecular-weight polyethylene (UHMwPE), for instance Dyneema or Spectra.

The attachment element 21 for attaching to the tether may comprise an eye bolt screwed into a threaded hole in the middle section of the main body of the harpoon, and the first end of the tether 16 may be secured to the eye of the eye bolt. Typically the attachment element would be aft of the retardation component 18. However, the attachment element could be located in a variety of different locations on a harpoon.

For reasons concerning the desired stability of the harpoon's movement behaviour once launched, the centre of mass of the harpoon would typically lie both towards the first end of the main body, corresponding to the end that will penetrate the space object, and between the first end of the main body and the attachment element 21.

The tether management arrangement 14 comprises a tether storage 26, a motor 27 and a tether releaser 28. The tether storage 26 stores a length of tether and may, for example, comprise a drum onto which loose tether 16 can be wound. The motor 27 can be used to retract and deploy a portion of the length of tether between the attachment element 21 and tether management arrangement 14. For example, the motor may comprise a clutch motor capable of retracting and deploying the tether to and from the tether storage, and of controlling the speed and force with which it does this. It will be appreciated that in some embodiments, a motor is not required and the tether may be unwound from its storage 26 by the force exerted on the tether as the harpoon is launched. The tether releaser releases an amount of the tether, which will include the first end of the tether, from the tether management arrangement. For example, the tether releaser may be a cutting arrangement capable of severing the tether and therefore releasing a length of tether, attached to the harpoon, from the tether management arrangement.

The operation of the launching mechanism 13 of the harpoon launcher 5 will now be described. The flow control arrangement 12 delivers gas at a certain pressure and/or volume to the launching mechanism 13 in order that a harpoon may be launched. The gas would pass through the gas port of the launching mechanism and into the space within the launch barrel 22 between the first end of the launch barrel and the piston bush 23. The pressure of the gas on the piston bush would then force the piston bush 23, and with it the harpoon 3, towards the second end of the barrel until the piston bush meets, and is stopped by, the alignment bush 24. At this point the momentum of the harpoon 3 would cause it to leave the launch barrel 22 and continue to travel along a trajectory approximately coinciding with the axis of the launch barrel 22.

Although the launching mechanism has been described with respect to the launching mechanism as shown in FIG. 2, it will, however, be appreciated that the launching mechanism may differ from that shown in FIG. 2. For example, as mentioned above, the launching mechanism may not comprise a piston bush 23. In this case the second end of the harpoon and the launch barrel may be configured so that when gas is passed through the gas port 25, the pressure of the gas on the second end of the harpoon would force the harpoon out of the barrel, launching it. For instance, as well as not comprising the piston bush, the launching mechanism may also not comprise an alignment bush 24 and the diameter of the aft section 17c of the harpoon may correspond to the internal diameter of the launch barrel such that it fits closely inside the launch barrel.

In other contexts, it is known to impart a projectile, for instance a javelin, with a spin about its long axis in order to gyroscopically stabilise its flight. For reasons concerning the attachment of the tether 16 to the harpoon and the lack of aerodynamic effects in space, the launch barrel 22 and the harpoon 3 may be configured so as to not affect a significant rotational force on the harpoon about its main body cylindrical axis as it is launched.

The impact of the harpoon 3 with the target object will now be described. Once the harpoon comes into contact with the object, the tapered first end of the harpoon main body 17 will penetrate the object. The momentum of the harpoon will then affect how far the first end of the harpoon travels into the object before the harpoon comes to rest. The speed with which a harpoon is launched by the harpoon launcher 5 therefore affects the depth to which the harpoon will penetrate an object. As previously described, the launch controller 10 can control the speed with which a harpoon is launched by controlling the pressure and/or volume of gas which is delivered to the launching mechanism 13 by the flow control arrangement 12. The launch controller 10 can therefore control the harpooning depth.

If the harpoon penetrates an object far enough, then the front plate 18a of the retardation component will come into contact with the surface of the object. At this contact, as the momentum of the harpoon continues to carry the forward section of the harpoon into the object, the surface of the object would resist the continued movement of the retardation component 18 with the main body 17 of the harpoon. This would exert a compressive force on the retardation component. Under this loading, the absorber component would fail structurally, or deform, in a progressive manner. The absorber component would therefore absorb part of the kinetic energy of the harpoon, and, as a result, the retardation component would progressively bring the harpoon to rest while absorbing energy which would otherwise have been imparted to the structure of the object, and possibly have damaged it. By altering various aspects of the harpoon it is possible to tailor the effect of the retardation component on the harpooning behaviour of the harpoon. For example, a harpoon with a shortened forward section, or wherein the material of the absorber component was harder to compress, would not penetrate as far into an object before being brought to rest by the retardation component.

Furthermore, for a given targeted object, the retardation component therefore allows for the use of a range of harpoon launching speeds while all the time ensuring that the harpoon will come to rest at a harpooning depth between a maximum possible harpooning depth, at which the absorber component will be fully compressed, and a minimum harpooning depth, at which the absorber component will be only slightly compressed. For example, the harpoon may be configured such that, at the minimum harpooning depth, there would be a sufficient amount of the forward section impaled within the object for the barbs to be able to grasp the object, and such that, at the maximum harpooning depth, the harpoon would still not be able to reach any internal components of the object which one would not wish to damage.

Moreover, if the absorber component had been configured with a certain target object in mind, such that it would fail structurally, or deform, before the surface of that object would fail structurally, or deform, as previously described, then the retardation component could be used to control harpooning depth while also ensuring that no substantial damage is caused to the surface structure of the object.

The harpoon launcher 5 and the harpoon 3 of FIG. 2 therefore provide a means for capturing objects by harpooning them, while also, together or on their own, being able to control the harpooning depth.

Figure 3:
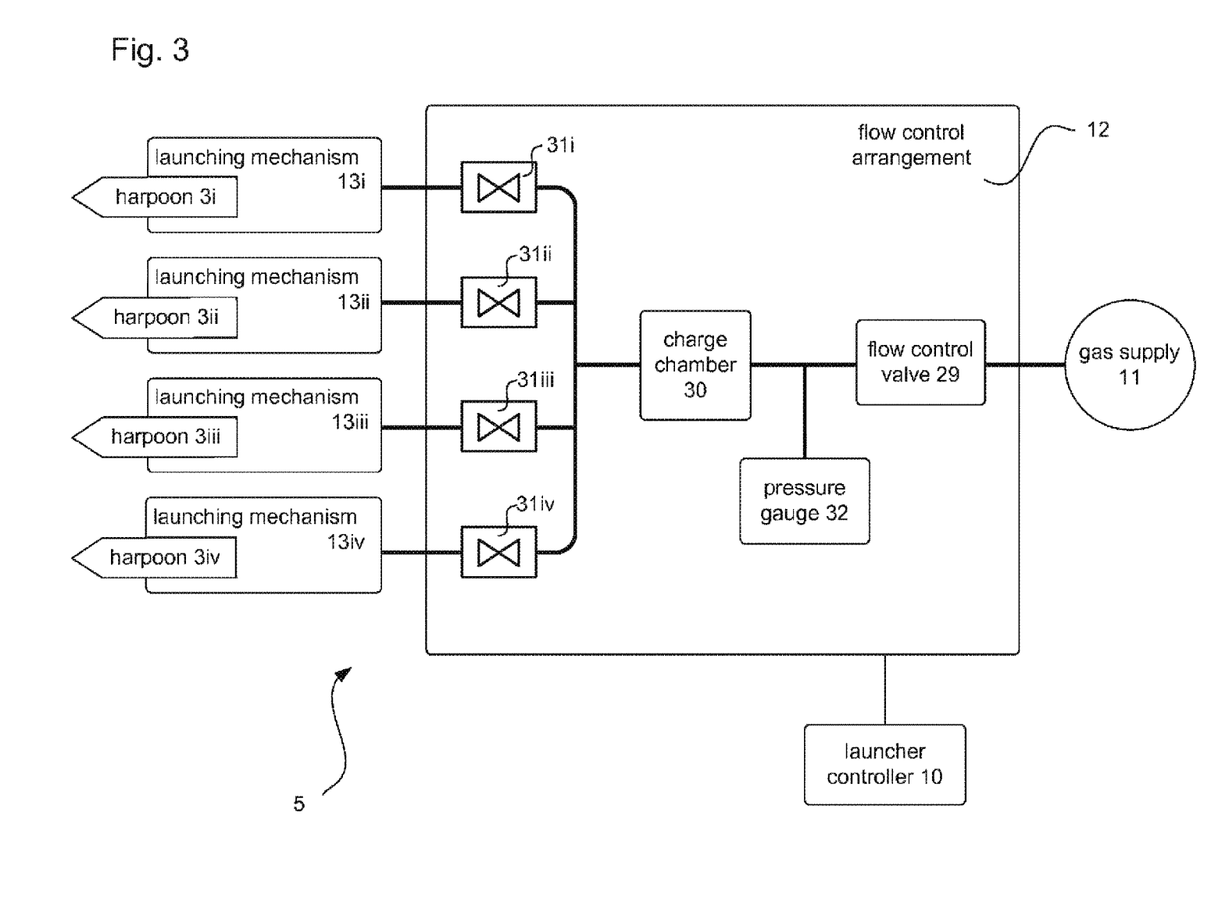
FIG. 3 is a schematic diagram showing the components of a harpoon launcher and a plurality of harpoons loaded therein.

With reference to FIG. 3, a harpoon launcher 5, loaded with a plurality of harpoons, is shown. The harpoon launcher comprises a launch controller 10, a gas supply 11 and a flow control arrangement 12 as described with respect to FIG. 2. In FIG. 2, only a single launching mechanism 13 is shown whereas FIG. 3 shows a plurality of launching mechanisms 13i, 13ii, 13iii, 13iv. Each harpoon 3i, 3ii, 3iii and 3iv is shown loaded into a corresponding launching mechanism 13i, 13ii, 13iii, 13iv of the harpoon launcher.

As is shown in FIG. 3, the flow control arrangement 12 comprises a flow control valve 29, a charge chamber 30, a plurality of launcher valves 31i, 31ii, 31iii, 31iv, wherein each launcher valve 31i, 31ii, 31iii, 31iv corresponds to a different launching mechanism 13i, 13ii, 13iii, 13iv of the harpoon launcher, and a pressure gauge 32.

The flow control valve 29 receives the gas from the gas supply 11 and is controlled by the launch controller 10 to control the flow of the gas to the charge chamber 30. For example the flow control valve may be a solenoid valve. The charge chamber 30 comprises a chamber with a first opening through which gas from the flow control valve can pass into the chamber, and a second opening through which gas can leave the chamber and pass to each of the launcher valves 31i, 31ii, 31iii, 31iv. The charge chamber is capable of containing gas at high pressures.

Each launcher valve 31i, 31ii, 31iii, 31iv is controlled by the launch controller 10 to open or close the route through which gas can pass from the charge chamber 30 to the launching mechanism corresponding to that launcher valve. For example, the launcher valves may be latch valves.

The pressure gauge 32 detects the pressure of the gas in the charge chamber 30 and provides the launch controller 10 with this information. The launch controller can therefore control the flow control arrangement based on the information received from the pressure gauge 32 about the gas pressure. For example, the pressure gauge may be an electronic pressure sensor, for instance a piezoresistive strain gauge or an optical pressure sensor.

Each launching mechanism 31i, 31ii, 31iii, 31iv is capable of launching a harpoon in the direction in which it is aimed when provided with a supply of gas at an appropriate pressure from the charge chamber 30. Through the mechanics of each launching mechanism, the force with which a harpoon is launched, and therefore the speed of a launched harpoon, is dependent on the pressure of the gas which passes to the launching mechanism from the charge chamber.

The operation of the flow control arrangement by the launch controller 10, in order to launch one of the plurality of harpoons, will now be described. However, it will be appreciated that the controller can launch some or all of the multiple harpoons simultaneously. In other words, the compressed gas supply 11 can be used to enable some or all of the multiple harpoons to be fired individually or simultaneously. Prior to launching the one or more harpoons, the launch controller 10 would have closed the flow control valve 29 and the launcher valves 31i, 31ii, 31iii, 31iv. The launch controller would then control the flow control valve 29 to allow a certain rate of gas flow from the gas supply to the charge chamber 30. At the same time, the launch controller would monitor the pressure of the gas in the charge chamber 30 determined by the pressure gauge 32. The launch controller 10 would then close the flow control valve when the gas in the charge chamber had reached a desired pressure based on the reading from the pressure gauge. The launch controller 10 would then open the launcher valve corresponding to the launching mechanism loaded with the harpoon to be launched. Gas from the charge chamber 30 would therefore pass to that launching mechanism, where it would cause the harpoon to be launched. The launch controller 10 would then close the opened launcher valve, leaving the harpoon launcher 5 ready to repeat the process with another of the harpoons. The launch controller is therefore capable of controlling which harpoons are launched by controlling which launcher valve the gas of the charge chamber is released through. Furthermore, the launch controller is also capable of controlling the speed with which each individual harpoon is launched by controlling the pressure of the gas stored in the charge chamber before this gas is released to the associated launching mechanism. As previously described, the momentum of a harpoon which has been launched from the harpoon launcher at an object will affect how far the harpoon travels into the object before the harpoon comes to rest. The launch controller 10 is therefore capable of controlling the depth to which each of the individual harpoons can penetrate target objects.

The pressure of the gas in the charge chamber 30 can be controlled to be sufficiently high to launch two or more harpoon simultaneously. Alternatively, instead of having a single charge chamber, a separate charge chamber can be provided for each launching mechanisms such that the charge pressure for each harpoon can be set separately although the harpoons may be launched at the same time. Accordingly, if multiple harpoons are launched simultaneously, they can be controlled to be launched with the same or different firing velocity.

It will be appreciated that although the flow control valve 29, the charge chamber 30, the launcher values 31i, 31ii, 31iii, 31iv and the pressure gauge 32 have been described with respect to a launcher for a plurality of harpoons, the flow control arrangement 12 of a launcher for a space vehicle which is only configured to carry one harpoon may also include a flow control valve, a charge chamber, a pressure gauge and a launch valve. However, since the launcher would only need to provide pressurised gas to a single launching mechanism it would only need one of the launch valves described with respect to FIG. 3 and the launch controller would not need to be configured to make a decision about which launcher valve to open.

Various aspects of at least one of the harpoons of FIG. 3 may be different from the other harpoons such that the at least one harpoon will have a different harpooning behaviour. For example, with reference to the description of the harpoon of FIG. 2, one of the harpoons may have a shorter forward section than the others, and would therefore not penetrate as far into an object before being brought to rest by the retardation component 18. Since the retardation component acts as a backstop for the harpoon, only the length of the forward section 17a, minus the length of the retardation component 18 once the harpoon has come to rest in the target object, would penetrate the target object. It may be desirable that the harpoon penetrates only the wall of a target object and not any internal components and different harpoons may have forward sections of different lengths in order to be suitable for penetrating the walls of different objects. For the same purpose, the absorber components of different harpoons may, for example, comprise different materials, such that they will fail structurally, or deform, to differing extents under a given load. This would provide a further means of controlling harpooning depth, as different harpoons of the plurality of harpoons could be selected dependant on the depth to which an object needed to be harpooned. Alternatively, the absorber components of different harpoons may, for example, comprise different materials, such that they will fail structurally, or deform, at differing levels of compressive load. In this case, given a certain desired depth of penetration, a harpoon may be selected for launching depending on what launching speed is required to achieve the initial penetration of the target object. This would provide a means of maintaining the same harpooning depth over a range of harpooning speeds.

The harpoon launcher 5 and the harpoons of FIG. 3 therefore provide a means for capturing objects by harpooning them, while also, together or on their own, being able to control the harpooning depth.

A space vehicle comprising the system of FIG. 3 would be capable of capturing multiple objects, before then deorbiting them. Each harpoon may be connected to a tether management system 14 as described with respect to FIG. 2 and when a first harpoon has been launched, the tether management system could be used to sever the tether connecting it to a harpooned first object. The space vehicle can be used to deorbit the object before the tether is severed. The space vehicle would then be able to capture and deorbit a second object, before again severing the connecting tether. In this way the system would be capable of sequentially capturing and deorbiting multiple objects. Alternatively, the harpoons may not be connected to the space vehicle via a tether and may instead comprise a means for independently affecting an impulse on a harpooned object in order to deorbit it, as will be described in more detail with reference to FIG. 4. This would allow the system to capture and independently deorbit multiple objects.

Figure 4:
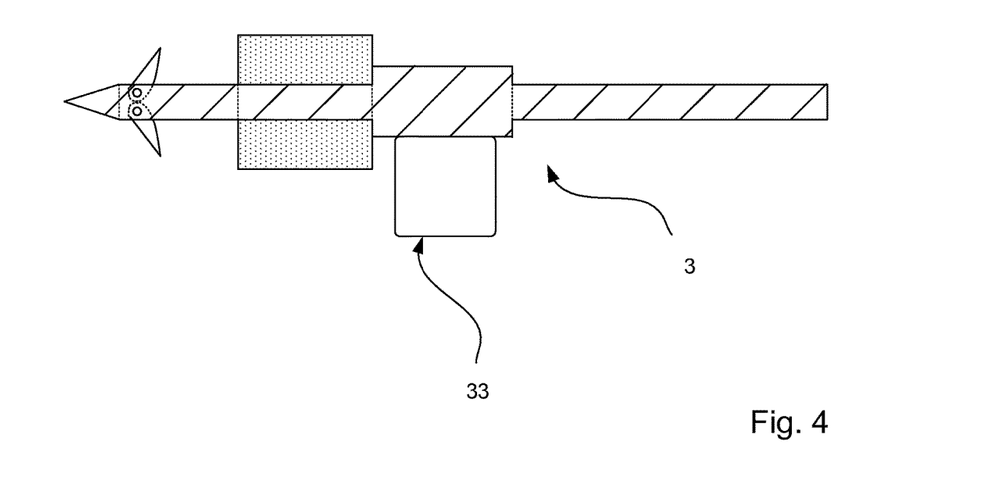
FIG. 4 illustrates a harpoon comprising deorbiting equipment.

With reference to FIG. 4, a harpoon for capturing and deorbiting objects in space is shown. The harpoon comprises a main body 17, a retardation component 18 and barbs 19, each of which have been described with reference to FIG. 2. Additionally, the harpoon also comprises a motive force component 33. The motive force component can be any component capable of exerting a motive force on the harpoon. The motive force component can impart an impulse on an object which has been harpooned and can therefore be used to deorbit, or change the orbit, of a harpooned object.

The motive force component 33 may exert a motive force on the harpoon through active or passive means. For example, an active motive force component might comprise a solid rocket or a thruster. Alternatively, a passive motive force component might, for example, comprise an aerodynamic drag device, for instance a deployable sail or sail-like device, intended to passively deorbit a harpooned LEO object by increasing the atmospheric drag experienced that object. The use of a motive force component which works passively, such as the example described above, may be particularly applicable to the deorbiting of smaller objects, where the point of re-entry into the Earth's atmosphere, or even the point of an eventual impact on the Earth's surface, does not need to be controlled. This is likely to be the case for objects which would either burn up completely upon re-entry or which would carry too little energy on impact to pose a threat to individuals on the ground.

By using a motive force component on the harpoon, a space vehicle for carrying a plurality of harpoons will not need to deorbit each object before capturing another object. The space vehicle can launch a first harpoon to capture a first object and then move on to a second object and allow the launched harpoons to deorbit the captured objects using their respective motive force components.

Figure 5:
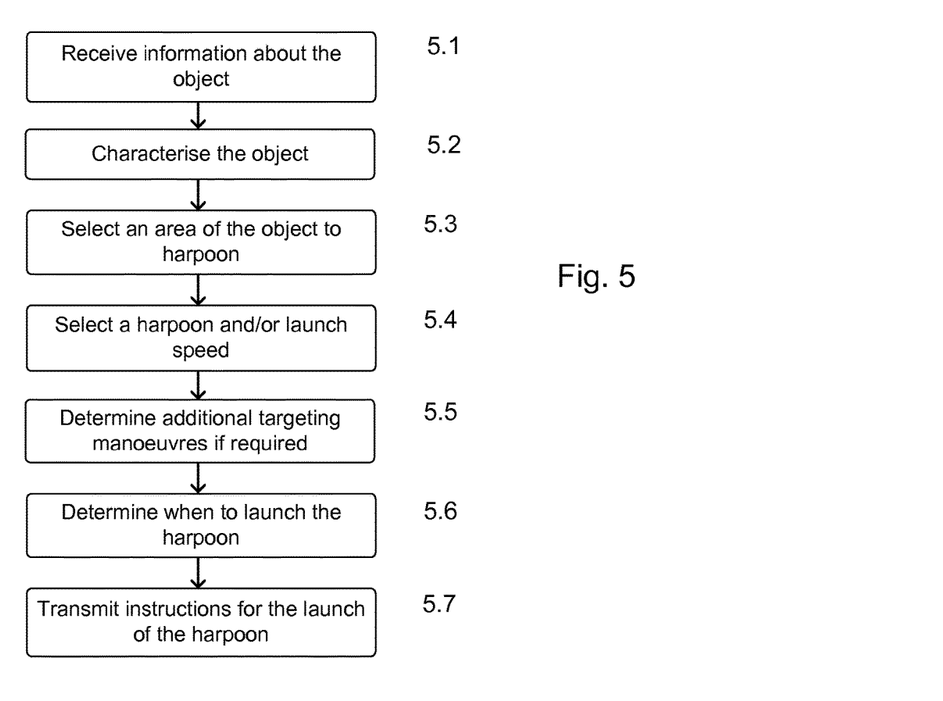
FIG. 5 illustrates a process for characterising and capturing a space object.

With reference to FIG. 5, a method for the ground controller 4 of FIG. 1 to control the harpooning of an object is shown. The method assumes that the space vehicle has already achieved a rendezvous with the object to be harpooned and is therefore within harpooning range of the object. For example, the ground controller 4 may have selected an object from a database of objects for harpooning and instructed the controller 6 of the space vehicle, via the communication module 9, to utilise its propulsion arrangement in such a way as to rendezvous with the object. Such a database of objects may, for example, contain mass, geometry and orbital information about the objects as has been briefly described above.

At step 5.1 the ground controller 4 receives information about the object which has been determined by the observation arrangement 8 of the space vehicle and transmitted to the ground controller 4, via the communication module 9, by the controller 6. For example the ground controller may have initially transmitted instructions to the controller of the space vehicle to utilise the observation arrangement 8 and relay the observed information back to the ground controller. The information about the object determined by the observation arrangement may for example comprise visual imagery, or information concerning other bands of electromagnetic radiation from the object, for instance infrared, radio wave or micro wave radiation.

At step 5.2 the ground controller uses the information about the object received at step 5.1 to determine certain characteristics of the object. For example, the ground controller may be able to determine the bearing and range of the object relative to the space vehicle 2. Furthermore, the ground controller 4 may be able to determine if the object is rotating and, if so, further determine its axis and rate of rotation. Moreover, the ground controller 4 may be able to determine certain physical characteristics of the object from the received information. For example, the ground controller may be able to determine the size of the object, the shape of the object and/or aspects of the external and/or internal structure of the object. Based on the information, the ground controller may also be able to estimate the mass of the object. Further still, if the object is of human origin, for example a disused satellite, the ground controller may be able to identify the object and therefore determine detailed information concerning the object's likely external and internal structure. The characterisation process may be performed, at least in part, by computer at the ground controller. Furthermore, if a specific object was targeted, the observation information and determined characteristics of the object may be used by the ground controller to verify that the correct object has been targeted by the space vehicle. For instance, the observation information and other derived information may be compared to information stored in a database of known objects from which the object intended for harpooning was originally selected by the ground controller.

At step 5.3 the ground controller 4 uses the characteristics of the object determined at step 5.2 to select an area of the object to harpoon. For example, if the object is a disused satellite, the ground controller may have determined that a particular area of the surface of the satellite comprises paneling which is particularly suitable for harpooning.

At step 5.4, the ground controller 4 then selects a suitable harpoon and/or launch speed for ensuring that the harpoon penetrates the object to an appropriate depth. The selected speed may be obtained by selecting a gas pressure and/or volume of gas to be provided to the launching mechanism 13 by the flow control arrangement 12. The ground controller 4 may select a speed and the launch controller 10 may choose the appropriate gas volume and/or pressure to achieve the selected speed or the ground controller 4 may determine the required volume of gas and/or gas pressure to achieve a desired speed and send the determined values to the space vehicle for the launch controller to control the flow of gas provided to the launching mechanism in accordance with the determined values received from the ground controller. As discussed above, the launch controller may control the flow of gas to a launch mechanism by monitoring information from a pressure gauge connected to a charge chamber. Accordingly, the ground controller 4 may determine a gas pressure required in the charge chamber for the launch one or more harpoons and the launch controller may ensure that the readings provided from the pressure gauge connected to the charge chamber match a gas pressure value received from the ground controller, and corresponding to the determined gas pressure, before the one or more harpoons are launched.

The ground controller may select a suitable speed for allowing the harpoon to penetrate the surface of the object and to a depth that ensures that it is securely attached to the object while still not having a momentum, on impact, which is higher than that appropriate for the retardation component of the selected harpoon. For example, if the object is a rocket body, it may have an aluminium wall of a thickness between 3 and 4 mm and the ground controller may determine that the harpoon would require a comparatively high kinetic energy of between 200-300 Joules to penetrate the wall of the rocket and therefore select a comparatively high launch speed. Alternatively, if, for example, the object is a dead satellite with aluminium sandwich panels comprising a skin thickness of 1 mm on either side, a lower kinetic energy of, for example, only 20 Joules may be required to penetrate the surface of the object and a lower speed may be selected. Since the retardation components 18 of the harpoons for capturing the objects mentioned in the two examples above would be required to absorb different amounts of kinetic energy in the two examples, harpoons with different types of retardation components may be suitable for the two examples. Moreover, if the internal structure of the object is known, a harpoon may be selected in dependence on the location of the retardation component along the main body of the harpoon. For example, if the ground controller has identified the object to be harpooned and it knows the location of a fuel tank inside the object, it may select a harpoon with a suitably located and arranged retardation component 18 for not piercing the fuel tank. The space vehicle may comprise a plurality of harpoons having retardation components of different materials, designs, dimensions and positions along the harpoon. The ground controller may therefore select one or more characteristics of a retardation component corresponding to the materials, design, dimension and position. Each harpoon may have identification data identifying the harpoon or the type of harpoon. Furthermore, the selection of one or more characteristics of a retardation component may comprise selecting identification data corresponding to one or more harpoons having the desired characteristics and sending the identification data to the space vehicle for the controller 6 of the space vehicle to select a harpoon based on the identification data. Of course, if the space vehicle only carries one harpoon or a plurality of identical harpoons, the ground controller can only control the penetration depth by selecting a suitable speed.

At step 5.5, the ground controller 4 determines if additional maneuvering or changes to the orientation of the space vehicle 2 are required in order to aim the harpoon at the selected area of the object. If this is the case, the ground controller transmits the required instructions to the central controller 6 of the space vehicle, which then carries out these instructions using the propulsion arrangement 7.

At step 5.6, the ground controller then selects a suitable time for launching the harpoon. For example, if the target object is spinning, the ground controller may analyse the movement of the target and identify the optimum time for launching the harpoon in view of the moment of the target.

The ground controller 4 then transmits instructions for the launch of the harpoon to the central controller 6 of the space vehicle at step 5.7. The central controller 6 receives the instructions from the ground controller and passes the instructions to the launch controller 10. The launch controller chooses the harpoon to the launched and controls the flow of gas to the launch mechanism for the harpoon to achieve the required gas pressure for providing a desired launch speed. The launch controller then launches the harpoon at a time in accordance with the instructions from the ground controller.

The steps described with respect to FIG. 5 can be carried out in hardware or software or a combination of both in the ground controller. It is contemplated that instructions for carrying out the steps may be stored in a computer program to be run by a processing apparatus such as a computer or a number of computers in the ground controller. Some steps may need input from a human operator and the instructions may then prompt a human input for instructions and information.

Whilst specific examples of the invention have been described, the scope of the invention is defined by the appended claims and not limited to the examples. The invention could therefore be implemented in other ways, as would be appreciated by those skilled in the art.

It will be realised that while it has been described that the depth of penetration into the space debris object is determined both by the retardation component and the gas pressure set by the launch controller, the invention is not limited to including both means for controlling the depth of penetration. The system may include a harpoon without a retardation component in which case the depth of penetration would be controlled by the launcher 5 and not by a retardation component on the harpoon. Alternatively, the launcher may not be capable of controlling the launch speed in which case the depth of penetration would be controlled by a retardation component on the harpoon only and not by the launcher.

Moreover, although the mechanism of the launcher for controlling the depth of penetration has been described to use a supply of pressurised gas, alternative means for launching the harpoon may be used. Instead of using pressurised gas, the harpoon launcher may be configured to launch a harpoon by using explosives or mechanical energy. Where the harpoon launcher uses a mechanism for launching the harpoon that allows the launch speed to be varied, the harpoon launcher can control the depth of penetration into the target by controlling the launch speed.

While a ground controller has been described for controlling the space vehicle, the controlling equipment for controlling the space vehicle does not need to be located on ground. For example, if the space vehicle is a satellite in an orbit about a celestial body other than the Earth, the ground controller may be a controller located on a space vehicle. Moreover, instead of receiving information and sending instructions directly to the space vehicle the controller 4 may receive information and send instructions via another spacecraft.

The invention claimed is:

1. An apparatus for capturing a space object, the apparatus comprising:
a harpoon element for penetrating a space object, the harpoon element being configured to form part of a harpoon for launching towards the space object; and
penetration control means for controlling penetration of the harpoon element into the space object,
wherein the penetration control means comprises retardation means also forming part of the harpoon and being coupled to the harpoon element, and
wherein the retardation means comprises a compressible component arranged to compress on impact with the space object to control an extent of penetration of the harpoon element into the space object.

2. The apparatus according to claim 1, wherein said compressible component of the retardation means comprises a crushable element arranged to deform on impact with the space object to control the extent of penetration.

3. The apparatus according to claim 1, comprising:
the harpoon comprising said harpoon element and retardation means, wherein the harpoon comprises a first section, providing the harpoon element, and a second section coaxially joined with the first section, the first section and the second section each having an outer surface extending in a longitudinal direction of the first and second section, and the second section having a larger cross-sectional area than the first section to provide an end surface around the base of the first section where the first section joins the second section, wherein the retardation means extends at least partially around at least a portion of the longitudinal surface of the first section and the end surface of the second section is arranged to provide a back stop surface for the retardation means.

4. The apparatus according to claim 3, wherein the retardation means comprises a front plate, a back plate and said compressible component between the front plate and the back plate, and the front plate, the back plate and the compressible component each having a hole arranged coaxially with the other holes to receive the first section and being located such that the back plate is in contact with at least a portion of the end surface of the second section.

5. The apparatus according to claim 2, wherein the compressible component comprises a columnar honeycomb structure orientated such that column axes of the columnar honeycomb structure are substantially parallel to the axis of the first and the second section.

6. The apparatus according to claim 1, comprising:
a barb arrangement coupled to the harpoon element for preventing the harpoon element from being removed from the space object.

7. The apparatus according to claim 6, wherein the harpoon element has a substantially elongate shape and wherein the barb arrangement comprises at least one barb hinged to the harpoon element, the at least one barb being configured to be arranged at an acute angle to a longitudinal axis of the elongate harpoon element when deployed.

8. The apparatus according to claim 1, further comprising:
a deorbiter for deorbiting a captured space object, the deorbiter forming part of the harpoon and comprising a rocket, a thruster or a sail.

9. A space vehicle comprising:
a launch arrangement for launching one or more harpoons for firing at and capturing a space object, the launch arrangement comprising
a controller for controlling penetration of the one or more harpoons into the space object,
wherein the controller for controlling penetration is configured to vary a launch velocity of the one or more harpoons, and
retardation means comprising a compressible component arranged to compress on impact with the space object to control an extent of penetration of the harpoon element into the space object.

10. The space vehicle according to claim 9, wherein the launch arrangement comprises an expansion chamber, a gas flow arrangement and a compressed gas supply for launching the one or more harpoons and wherein the controller is configured to vary a pressure of gas in the expansion chamber to thereby vary the launch velocity of the one or more harpoons and control a depth of penetration of the harpoon element into the space object.

11. The space vehicle according to claim 9, wherein the launch arrangement is configured to launch a plurality of harpoons and comprises an expansion chamber for each of the plurality of harpoons and the controller is configured to control gas to be provided to each expansion chamber to simultaneously or individually launch the plurality of harpoons.

12. A method of capturing an object in space using a system comprising a spacecraft and at least one harpoon for launching towards the object, the at least one harpoon comprising a harpoon element for penetrating the object and the system further comprising means for controlling the penetration of the harpoon element into the object and retardation means comprising a compressible component, the method comprising:

characterizing an object to be captured;

selecting at least one parameter for controlling a depth of penetration of the harpoon element into the object, wherein selecting the at least one parameter comprises selecting at least a parameter corresponding to a launch velocity and, if the at least one harpoon comprises a plurality of harpoons, a characteristic identifying one or more harpoons out of the plurality of harpoons; and providing instructions to the spacecraft for launching the at least one harpoon, wherein said instructions include said at least one parameter, and compressing the compressible component on impact with the space object to control an extent of penetration of the harpoon element into the space object.

13. The method according to claim 12, wherein the spacecraft comprises a launch arrangement comprising a compressed gas supply and a launching mechanism, for the at least one harpoon, for launching said at least one harpoon using gas from said compressed gas supply and wherein the method further comprises controlling a pressure of gas provided to the launching mechanism to launch the one or more harpoons at the selected velocity.

14. The method according to claim 12, wherein the plurality of harpoons includes at least two different harpoons.

* * * * *